United States Patent
Desikachari et al.

(10) Patent No.: US 11,567,800 B2
(45) Date of Patent: Jan. 31, 2023

(54) EARLY IDENTIFICATION OF PROBLEMS IN EXECUTION OF BACKGROUND PROCESSES

(71) Applicant: APPNOMIC SYSTEMS PRIVATE LIMITED, Bengaluru (IN)

(72) Inventors: Padmanabhan Desikachari, Bangalore (IN); Pranav Kumar Jha, Bangalore (IN)

(73) Assignee: APPNOMIC SYSTEMS PRIVATE LIMITED, Karnataka (IN)

( * ) Notice: Subject to any disclaimer, the term of this patent is extended or adjusted under 35 U.S.C. 154(b) by 187 days.

(21) Appl. No.: 16/949,176

(22) Filed: Oct. 19, 2020

(65) Prior Publication Data

US 2022/0027199 A1 Jan. 27, 2022

(30) Foreign Application Priority Data

Jul. 21, 2020 (IN) .............................. 202041031064

(51) Int. Cl.
  *G06F 9/50* (2006.01)
  *G06F 9/48* (2006.01)
(52) U.S. Cl.
  CPC .............. *G06F 9/50* (2013.01); *G06F 9/4881* (2013.01)
(58) Field of Classification Search
  None
  See application file for complete search history.

(56) References Cited

U.S. PATENT DOCUMENTS

| | | | |
|---|---|---|---|
| 6,820,045 B1 | 11/2004 | Asano et al. | |
| 8,356,306 B2* | 1/2013 | Herington | G06F 11/3442 |
| | | | 718/100 |
| 10,803,397 B2* | 10/2020 | Desikachari | G06Q 10/04 |
| 2012/0210326 A1 | 8/2012 | Torr et al. | |
| 2013/0185729 A1* | 7/2013 | Vasic | G06F 9/5072 |
| | | | 718/104 |
| 2016/0091540 A1 | 3/2016 | Marti et al. | |
| 2017/0046217 A1 | 2/2017 | Shinde et al. | |
| 2017/0124846 A1 | 5/2017 | Li et al. | |
| 2017/0153962 A1 | 6/2017 | Biegun et al. | |

OTHER PUBLICATIONS

International Search Report and Written Opinion issued by the International Searching Authority for Application No. PCT/IB2021/056445, dated Oct. 1, 2021, 09 pages.

* cited by examiner

*Primary Examiner* — Van H Nguyen
(74) *Attorney, Agent, or Firm* — IPHorizons PLLC; Narendra Reddy Thappeta

(57) ABSTRACT

An aspect of the present disclosure facilitates early identification of problems in execution of background processes. In one embodiment, a digital processing system characterizes the consumption of multiple resources during normal prior executions of a background process and determines a baseline pattern of consumption of resources for the background process. The system then monitors a current pattern of consumption of the resources during a current execution of the background process, and checks whether the current pattern of consumption has a deviation from the baseline pattern of consumption. The system notifies a potential problem with the current execution of the background process if a deviation is determined to exist. The notifications enable a user to get an early indication of potential problems during the execution of the background process itself.

20 Claims, 15 Drawing Sheets

Background process B metrics — 660

| Time | CPU Used (milliseconds) | Memory (MB) | I/O - # of write operations | I/O - # of read operations | Threads in process | % of CPU time used by process |
|---|---|---|---|---|---|---|
| 1/21/2020 0:01 | 3 | 640 | 17 | 16 | 5 | 2 |
| 1/21/2020 0:02 | 11 | 1100 | 10 | 35 | 13 | 3 |
| 1/21/2020 0:03 | 14 | 1395 | 32 | 26 | 11 | 3 |
| 1/21/2020 0:04 | 15 | 1605 | 38 | 89 | 16 | 5 |
| 1/21/2020 0:05 | 19 | 1220 | 26 | 43 | 10 | 6 |
| 1/21/2020 0:06 | 15 | 1890 | 44 | 22 | 4 | 6 |
| 1/21/2020 0:07 | 21 | 2115 | 51 | 17 | 18 | 6 |
| 1/21/2020 0:08 | 27 | 2319 | 26 | 39 | 6 | 9 |
| 1/21/2020 0:09 | 24 | 1985 | 33 | 68 | 12 | 8 |
| 1/21/2020 0:10 | 8 | 1692 | 12 | 81 | 15 | 3 |

*FIG. 6B*

Background process B baseline

| Time | CPU Used (milliseconds) | Memory (MB) | I/O - # of write operations | I/O - # of read operations | Threads in process | % of CPU time used by process |
|---|---|---|---|---|---|---|
| 0:01 | 5 | 825 | 19 | 18 | 6 | 2 |
| 0:02 | 10 | 1032 | 10 | 39 | 12 | 4 |
| 0:03 | 11 | 1325 | 35 | 31 | 9 | 4 |
| 0:04 | 15 | 1591 | 42 | 96 | 13 | 6 |
| 0:05 | 17 | 1004 | 25 | 67 | 11 | 7 |
| 0:06 | 16 | 1786 | 49 | 25 | 5 | 6 |
| 0:07 | 20 | 1985 | 50 | 18 | 19 | 8 |
| 0:08 | 25 | 1993 | 23 | 45 | 8 | 10 |
| 0:09 | 23 | 1856 | 34 | 75 | 14 | 9 |
| 0:10 | 9 | 1749 | 13 | 84 | 16 | 4 |

Background Processes – "**loyalty -file * --db ***" on App Host 1

Health Summary

Daily Anomaly counts, last 7 days — 765A

Avg run durations, last 7 days — 765B

Process Behavior Learning – baselined 2 phases

← 770

Recent Runs

| Full command line | Start time | End time | Duration | Anomalies |
|---|---|---|---|---|
| Loyalty – file /home/user/a.lst – bachsize 50 -db 10.0.0.32:7717 | 11:30:01 | 11:42:40 | 12.39 | |
| Loyalty – file /home/user/a.lst – bachsize 50 -db 10.0.0.32:7717 | 11:30:20 | 11:40:10 | 9.9 | |
| Loyalty – file /home/user/a.lst – bachsize 50 -db 10.0.0.32:7717 | 11:30:05 | 11:43:10 | 13.05 | |
| Loyalty – file /home/user/a.lst – bachsize 50 -db 10.0.0.32:7717 | 11:30:45 | 11:35:00 | 4.55 | 2 |

*FIG. 7D*

EARLY IDENTIFICATION OF PROBLEMS IN EXECUTION OF BACKGROUND PROCESSES

PRIORITY CLAIM

The instant patent application is related to and claims priority from the co-pending India provisional patent application entitled, "EARLY IDENTIFICATION OF PROBLEMS IN EXECUTION OF BACKGROUND PROCESSES", Serial No.: 202041031064, Filed: 21 Jul. 2020, which is incorporated in its entirety herewith.

BACKGROUND OF THE DISCLOSURE

Technical Field

The present disclosure relates to software systems and more specifically to early identification of problems in execution of background processes.

Related Art

Background processes are executed to process a large amount of data without human intervention/interactivity in the processing duration, as is well known in the relevant arts. Background processes are used in areas such as batch processing of transactions, batch update of records in a database, sending emails to a large number of recipients etc., as is also well known in the relevant arts.

Problems can be encountered during execution of background processes, typically due to situations not anticipated in the design of the process or underlying data sought to be processed. Due to the absence of interactivity and often design choice not to abort the background processing upon at least some problems, a background process may continue execution and process further data. Accordingly, problems encountered during execution are often identified after completion of execution of the background process.

As the background processes normally process large amounts of data and as such processing can span a long duration, there is a general need to identify occurrence of such problems at an earlier stage.

BRIEF DESCRIPTION OF THE DRAWINGS

Example embodiments of the present disclosure will be described with reference to the accompanying drawings briefly described below.

FIG. 6B is a resource table depicting the resource consumption metrics of a background process of a software application in multiple block durations, in one embodiment.

FIG. 6C is a baseline table depicting the baseline resource consumption of a background process of a software application in multiple block durations, in one embodiment.

FIGS. 7A-7E depict various user interfaces provided to a user for viewing of the baseline/actual resource consumption metrics of background processes in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
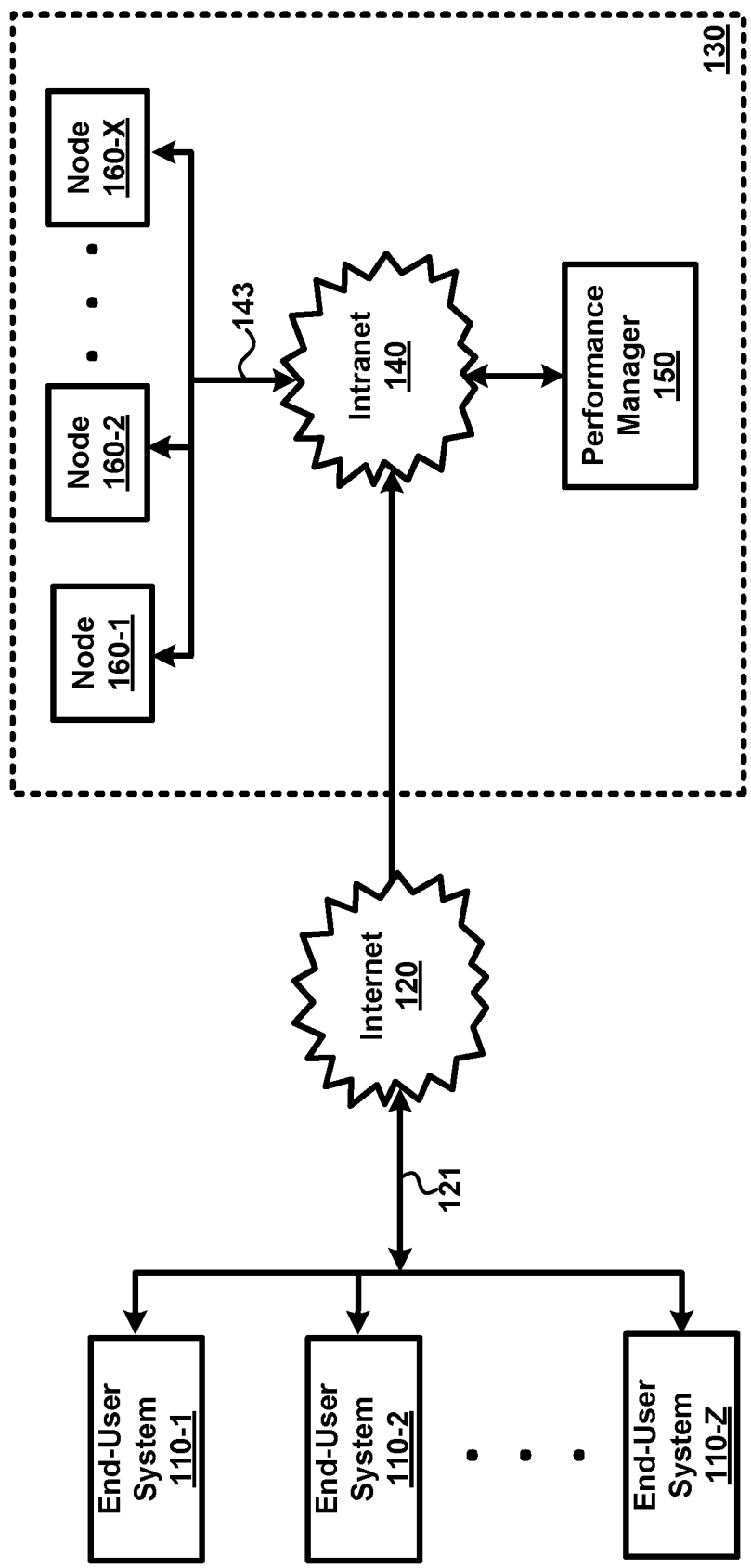
FIG. 1 is a block diagram illustrating an example environment (computing system) in which several aspects of the present invention can be implemented.

An aspect of the present disclosure facilitates early identification of problems in execution of background processes. In one embodiment, a digital processing system characterizes the consumption of multiple resources during normal prior executions of a background process and determines a baseline pattern of consumption of resources for the background process. The system then monitors a current pattern of consumption of the resources during a current execution of the background process, and checks whether the current pattern of consumption has a deviation from the baseline pattern of consumption. The system notifies a potential problem with the current execution of the background process if a deviation is determined to exist.

The notifications enable a user to get an early indication of potential problems during the execution of the background process itself. In one embodiment, the resources monitored include CPU used, memory used, number of read operations, number of write operations, and number of threads in said background process.

According to another aspect of the present disclosure, the system (noted above) determines that a deviation exists between the current pattern of consumption and the baseline pattern of consumption if the differences in consumption of the resources between the current pattern of consumption and the baseline pattern of consumption is disproportionate.

According to one more aspect of the present disclosure, the system (noted above) determines (and accordingly uses for characterization) the consumption of the resources in a sequence of prior block durations of equal time span during normal prior executions of the background process. As such, the system, during monitoring, determines the current pattern of consumption for each of a sequence of current block durations of the same equal time span during the current execution of the background process. The system performs the check of whether the current pattern of consumption has a deviation from the baseline pattern of consumption for each of the sequence of current block durations.

According to yet another aspect of the present disclosure, the system (noted above) generates a machine learning (ML) process model correlating the consumption of the resources in a sequence of prior block durations across the normal prior executions of the background process. Accordingly, the system predicts the baseline pattern of consumption based on the ML process model.

According to an aspect of the present disclosure, an execution of the background process includes multiple phases. Accordingly, the system (noted above) determines corresponding baseline patterns of consumption for each of the phases. As part of monitoring, the system identifies that the background process is operating in a specific phase, and accordingly checks (and notifies if required) the current pattern of consumption with respect to a specific baseline pattern of consumption determined for the specific phase.

According to another aspect of the present disclosure, the system (noted above) generates machine learning (ML) phase models corresponding to the phases of the background process, with each ML phase model correlating the consumption of the resources in a corresponding phase during normal prior executions of the background process. The system then predicts the corresponding baseline patterns of consumption for the multiple phases based on the corresponding ML phase models.

According to one more aspect of the present disclosure, the background process is designed to execute in multiple modes, wherein each mode causes the background process to execute in a respective set of phases. As such, the system (noted above) determines a corresponding set of baseline patterns of consumption for each of the modes, with the corresponding set including respective baseline patterns for each of the respective set of phases. As part of monitoring, the system identifies that the background process is operating in a specific mode, and accordingly checks (and notifies if required) the current pattern of consumption with respect to a specific set of baseline patterns of consumption determined for the specific mode. In particular, the system identifies the specific baseline pattern as the baseline pattern corresponding to the specific phase in the specific set of baseline patterns (corresponding to the specific mode).

In one embodiment, the background process is identified by a command line used to initiate execution of the background process, with the specific mode (of execution of the background process) being specified as a part of the command line.

According to an aspect of the present disclosure, the system (noted above) displays a radar chart with the resources represented as the axes of the radar chart and the consumption of the resources displayed as points along the axes, wherein each pattern of consumption of resources is represented as a corresponding shape connecting the points in the radar chart. As such, the baseline pattern of consumption and the current pattern of consumption are displayed as corresponding shapes in the radar chart. In one embodiment, the system further highlights, in the radar chart, a set of resources that are determined to have the deviation based on the checking.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing end-user systems 110-1 through 110-Z (Z representing any natural number), Internet 120, intranet 140, computing infrastructure 130 and performance manager 150. Computing infrastructure 130 in turn is shown containing nodes 160-1 through 160-X (X representing any natural number). The end-user systems and nodes are collectively referred to by 110 and 160 respectively.

Merely for illustration, only representative number/type of systems are shown in FIG. 1. Many environments often contain many more systems, both in number and type, depending on the purpose for which the environment is designed. Each block of FIG. 1 is described below in further detail.

Computing infrastructure 130 is a collection of nodes (160) that may include processing nodes, connectivity infrastructure, data storages, administration systems, etc., which are engineered to together host software applications. Computing infrastructure 130 may be a cloud infrastructure (such as Amazon Web Services (AWS) available from Amazon.com, Inc., Google Cloud Platform (GCP) available from Google LLC, etc.) that provides a virtual computing infrastructure for various customers, with the scale of such computing infrastructure being specified often on demand.

Alternatively, computing infrastructure 130 may correspond to an enterprise system (or a part thereof) on the premises of the customers (and accordingly referred to as "On-prem" infrastructure). Computing infrastructure 130 may also be a "hybrid" infrastructure containing some nodes of a cloud infrastructure and other nodes of an on-prem enterprise system.

All the nodes (160) of computing infrastructure 130 are assumed to be connected via intranet 140. Internet 120 extends the connectivity of these (and other systems of the computing infrastructure) with external systems such as end-user systems 110. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Each of end-user systems 110 represents a system such as a personal computer, workstation, mobile device, computing tablet etc., used by users to generate (user) requests directed to software applications executing in computing infrastructure 130. A user request refers to a specific technical request (for example, Universal Resource Locator (URL) call) sent to a server system from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or software application, with the IP packet including data identifying the desired tasks in the payload portion.

Some of nodes 160 may be implemented as corresponding data stores. Each data store represents a non-volatile (persistent) storage facilitating storage and retrieval of enterprise by software applications executing in the other systems/nodes of computing infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 160 may be implemented as corresponding server systems. Each server system represents a server, such as a web/application server, constituted of appropriate hardware executing software applications capable of performing tasks requested by end-user systems 110. A server system receives a user request from an end-user system and performs the tasks requested in the user request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) as a corresponding response to the user request. The results may be accompanied by specific user interfaces (e.g., web pages) for displaying the results to a requesting user.

In one embodiment, software applications containing one or more components are deployed in nodes 160 of computing infrastructure 130, with some of the components designed to execute as background processes in nodes 160. Examples of such software include, but are not limited to, data processing (e.g., batch processing, stream processing, extract-transform-load (ETL)) applications, Internet of things (IoT) services, mobile applications, and web applications. As is well known, batch processing or batch job usually consists of one or more background processes.

During (real-time/run-time) operation of a software application, some of the background processes are invoked for processing of user data (for example, stored in nodes 160 implemented as data stores). Such background processing is performed without user intervention (after instantiation of the background process) and also without requiring inputs from users at end-user systems 110 interactively. It may be desirable to characterize the operation of such background processes. Such characterization may be particularly desirable when the software application has multiple background processes deployed across multiple nodes (160) of the computing infrastructure (130).

In particular, as noted in the Background Section, problems encountered during execution of such background processes are often identified after completion of execution of the background processes due to factors such as absence of interactivity and design choice not to abort the background processing upon at least some problems. Furthermore, determination of the problems requires a user/developer to coordinate with ISV (independent software vendor) or IT (information technology) teams associated with a vendor of computing infrastructure 130.

Performance manager 150, provided according to several aspects of the present disclosure, facilitates early identification of problems in execution of background processes deployed in a computing infrastructure (130). Though shown internal to computing infrastructure 130, in alternative embodiments, performance manager 150 may be implemented external to computing infrastructure 130, for example, as a system connected to Internet 120. The manner in which performance manager 150 facilitates performance management of software applications is described below with examples.

3. Early Identification of Problems in Execution of Background Processes

Figure 2:
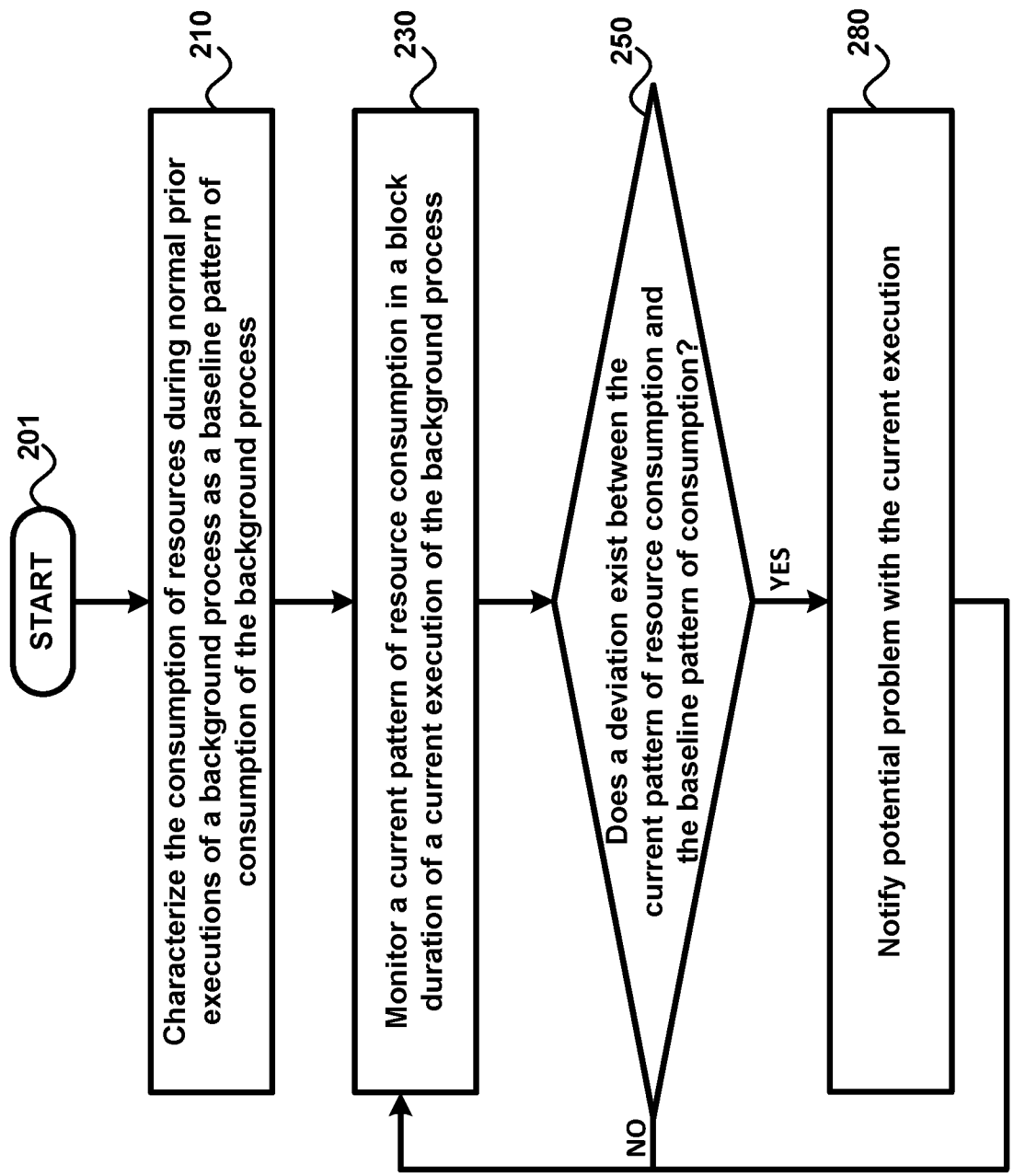
FIG. 2 is a flow chart illustrating the manner in early identification of problems in execution of background processes is facilitated according to aspects of the present disclosure.

FIG. 2 is a flow chart illustrating the manner in early identification of problems in execution of background processes is facilitated according to aspects of the present disclosure. The flowchart is described with respect to the systems of FIG. 1, in particular performance manager 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, performance manager 150 characterizes the consumption of resources during normal prior executions of a background process as a baseline pattern of consumption of the background process. Examples of resources are, but not limited to, infrastructure resources provided by the underlying computing infrastructure (130) such as compute/CPU, memory/RAM, disk/file storage, etc., or application resources such as database connections, application threads, etc. The baseline pattern quantifies consumption of such resources across prior executions.

The term "normal execution" refers to successful execution of a background process in which errors (e.g. exceptions/faults during execution) are not encountered. As may be readily appreciated components of a software application may be executed multiple times to cause instantiation of corresponding instances of the application as background processes. Thus, an instance of such a background process may be first characterized. However, during later operation of further instances of the background process, errors may occur, for example, due to configuration errors, inaccurate data, unexpected update of wrong data records, etc., as will be apparent to one skilled in the relevant arts.

In step 230, performance manager 150 monitors, during a block duration, a current pattern of consumption of the resources during a current execution of the background process. The current pattern of consumption may quantify the actual consumption of resources during the block duration. It should be appreciated that the block duration can be of fixed or variable time span, even though the embodiments below are described with respect to a fixed time span (e.g., one minute). Similarly, block durations can be non-overlapping time spans (as in the embodiments described below) or overlapping (e.g., sliding window).

In step 250, performance manager 150 checks whether a deviation exists between the current pattern of resource consumption and the baseline pattern of consumption. The deviation can be determined in any of several known ways by appropriate mathematical/statistical approaches to define the baseline pattern and the resource consumption, as will be apparent to a skilled practitioner.

Control passes to step 280 if a deviation is determined to exist between the current pattern of consumption and the baseline pattern of consumption and to step 230 otherwise, where performance manager 150 continues monitoring of the consumption of resources during a next block duration.

In step 280, performance manager 150 notifies a potential problem with the current execution in response to determining that a deviation exists between the current pattern of consumption and the baseline pattern of consumption. The notification may be sent to a user/developer or may be displayed on a display screen. Such a notification enables the user to get an early indication of a potential problems during the execution of the background process itself. Control then passes to step 230, where performance manager 150 continues monitoring of the consumption of resources during a next block duration.

Accordingly, performance evaluator 150 facilitates early identification of problems in execution of background processes deployed in a computing infrastructure (130). The manner in which performance manager 150 provides several aspects of the present disclosure according to the steps of FIG. 2 is illustrated below with examples.

4. Illustrative Example

FIGS. 3A-3B, 4, 5, 6A-6C and 7A-7E together illustrate the manner in which early identification of problems in execution of background processes is facilitated in one embodiment. Each of the Figures is described in detail below.

Figure 3A:
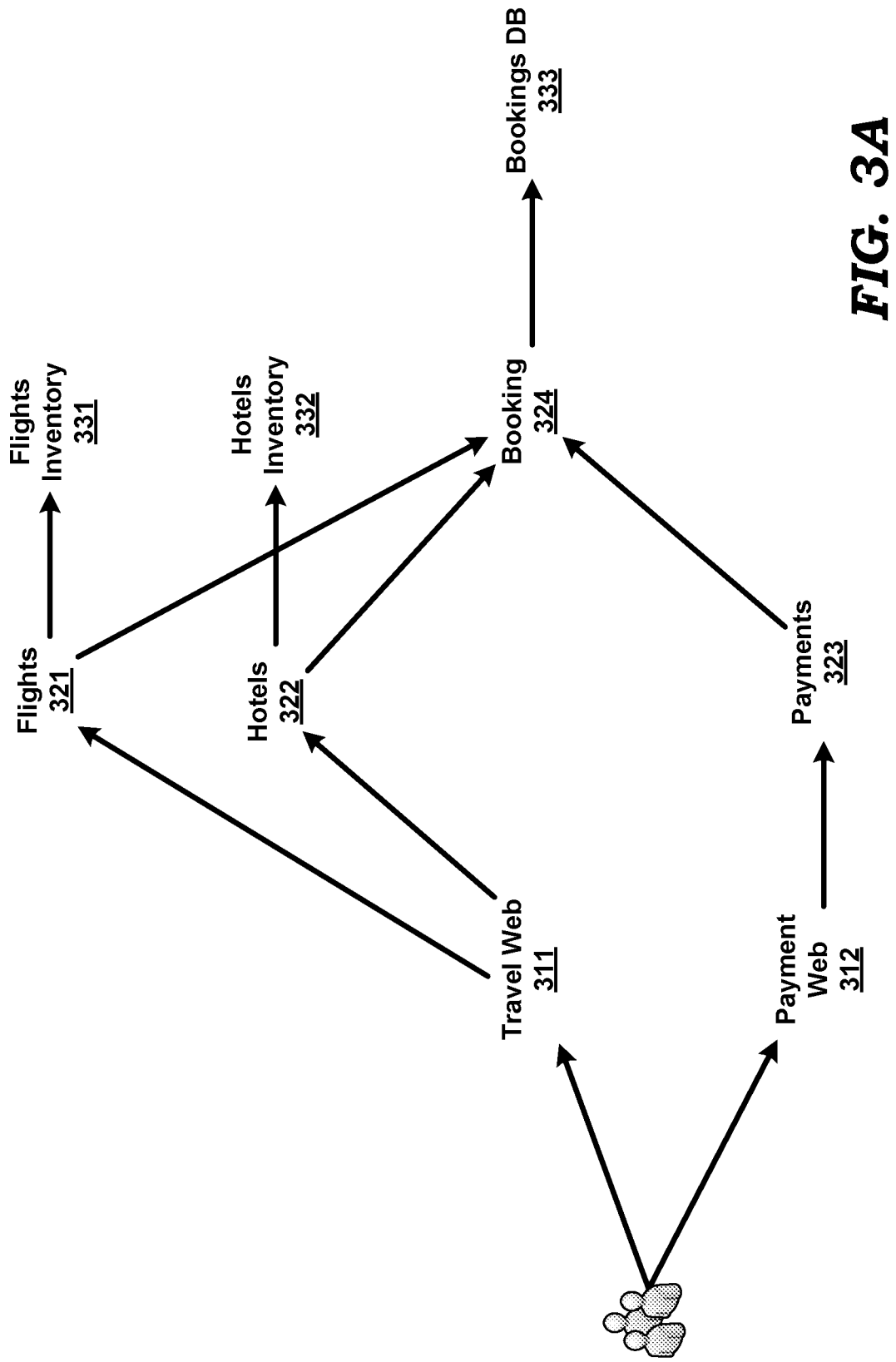
FIG. 3A depicts the details of a software application in one embodiment.

FIG. 3A depicts the details of a software application in one embodiment. For illustration, the software application is assumed to be an online travel application that enables users to search and book both flights and hotels. The online travel application is shown containing various components such as front-ends 311-312 (travel web and payment web respectively), backend services 321-324 (flights, hotels, payments and booking respectively) and data stores 331-333 (flights inventory, hotels inventory and bookings DB respectively).

Each of front-ends 311 and 312 is designed to process user requests received from external systems (such as end-user systems 110) connected to Internet 120 and send corresponding responses to the requests. For example, Travel Web 311 may receive (via path 121) user requests from a user using end-user system 110-2, process the received user requests by invoking one or more backend services (such as 321-323), and then send results of processing as corresponding responses to end-user systems 110-2. The responses may include appropriate user interfaces for display in the requesting end-user system (110-2). Payment Web 312 may similarly interact with end-user system 110-2 (or other end-user systems) and facilitate the user to make online payments.

Each of backend services 321-324 implements corresponding functionalities of the software application. Example of backend services are Flights service 331 providing the functionality of search of flights, Hotels service 322 providing the functionality of search of hotels, etc. A backend service (e.g. Flights service 321) may access/invoke other backend services (e.g. Booking service 324) and/or data stores (e.g. Flights Inventory 331) for providing the corresponding functionality.

Each of data stores 331-333 represents a storage component that maintains data used by other components (e.g. services, front-ends) of the software application. As noted above, each of the data stores may be implemented as a database server or file system based on the implementation of the software application.

The manner in which the various components of the software application (online travel application) are deployed in a computing infrastructure is described below with examples.

Figure 3B:
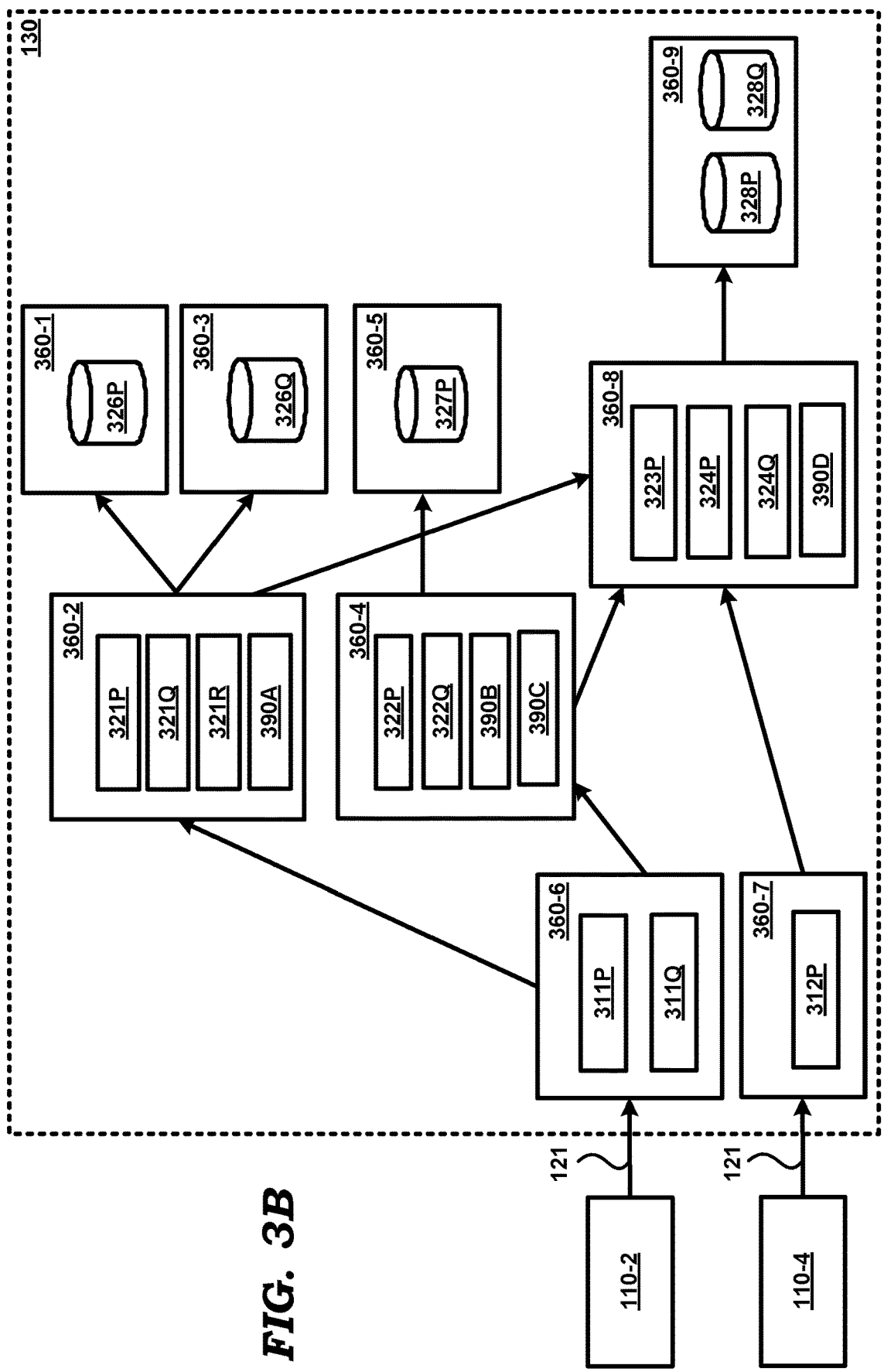
FIG. 3B depicts the manner in which a software application is deployed in a computing infrastructure in one embodiment.

FIG. 3B depicts the manner in which a software application is deployed in a computing infrastructure in one embodiment. In particular, the Figure depicts the manner in which the online travel application shown in FIG. 3A is deployed in computing infrastructure 130.

In one embodiment, virtual machines (VMs) form the basis for executing various software applications (or components thereof) in processing nodes/server systems of computing infrastructure 130. As is well known, a virtual machine may be viewed as a container in which software applications (or components thereof) are executed. A processing node/server system can host multiple virtual machines, and the virtual machines provide a view of a complete machine (computer system) to the applications/components executing in the virtual machine.

VMs 360-1 to 360-9 represent virtual machines provisioned on nodes 160 of computing infrastructure 130. Each of the VM is shown executing one or more instances (indicated by the suffix P, Q, R, etc.) of web portals 311-312 (implementing front-ends 311-312), application services 321-324 (implementing backend services 321-324) and/or data access interfaces 331-333 (implementing data stores 331-333). Such multiple instances may be necessitated for load balancing, throughput performance, etc. as is well known in the relevant arts. For example, VM 350-6 is shown executing two instances 311P and 311Q of the "Travel Web" web portal.

Each of batch jobs 390A-390D represents a batch process executing as part of the software application (online travel application). As noted above, each batch job 390A-390D may consists of one or more background processes. In the description below, it is assumed that each batch job 390A-390D consists of a single background process and accordingly the terms "batch job" and "background process" are used interchangeably.

However, in alternative embodiments, a batch job may instantiate multiple background processes, which may be characterized and monitored independently or in combination. In appropriate circumstances, multiple of such background processes may be together characterized and monitored, in which case the combined processes also may be conveniently viewed as a single background process.

Batch jobs 390A-390D are shown executing in corresponding VMs and accordingly consume the resources provided in the corresponding nodes 160 hosting the VMs. Each of nodes 160 has a fixed number of resources such as memory (RAM), CPU (central processing unit) cycles, persistent storage, etc. that can be allocated to (and accordingly used by) software applications (or components thereof) executing in the node. Other resources that may also be provided associated with the computing infrastructure (but not specific to a node) include public IP (Internet Protocol) addresses, etc. In addition to such infrastructure resources, application resources such as database connections, application threads, etc. may also be allocated to (and accordingly used by) the software applications (or components thereof).

As noted above, it may be desirable to characterize the execution of batch jobs 390A-390D, in particular, in terms of the consumption of resources by the batch jobs/background processes. Performance manager 150, provided according to several aspects of the present disclosure facilitates characterization of the operation of background processes and uses such characterization to facilitate early identification of problems in the execution of background processes (390A-390D). The manner in which performance manager 150 facilitates such characterization and early identification is described below with examples.

5. Executions of Batch Jobs

According to an aspect of the present disclosure, performance manager 150 collects OS (operating system) level resource consumption metrics such as CPU used, memory used, etc. by each of the background processes/batch jobs 390A-390D. After a suitable number of runs (instances of executions of the background process), a baseline pattern of consumption of the resources is determined. During a next run/execution, performance manager 150 calculates the deviation of the resources consumed during the next run with the baseline. The deviation is used to identify and notify anomalies during the next run.

According to another aspect, performance manager 150 determines (and accordingly uses for characterization) the consumption of the resources in a sequence of prior block durations of equal time span during normal prior executions of the background process. As such, performance manager 150, during monitoring, determines the current pattern of consumption for each of a sequence of current block durations of the same equal time span during the current execution of the background process. Performance manager 150 the performs the check of whether the current pattern of consumption has a deviation from the baseline pattern of consumption for each of the sequence of current block durations.

In the description below, the block duration is assumed to be a minute, with measurements performed in smaller units (sub-block) of a second. Alternative embodiments can be employed with different durations for blocks and sub-blocks, as will be apparent to a skilled practitioner based on the disclosure provided herein.

According to yet another aspect, an execution/run of a background process includes multiple phases. Furthermore, the background process is designed to execute in multiple modes, wherein each mode causes the background process to execute in a respective set of phases.

Figure 4:
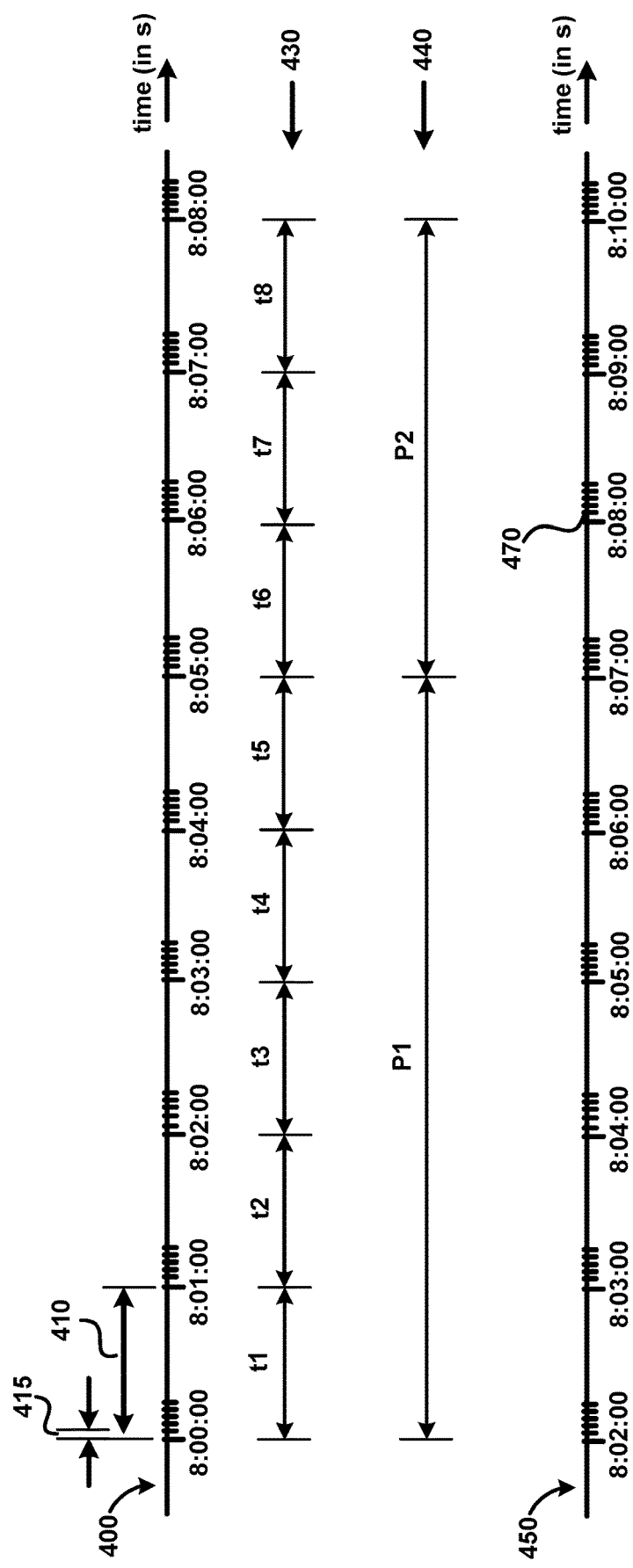
FIG. 4 depicts various timelines of operation of a background process in one embodiment.

FIG. 4 depicts various timelines of operation of a background process in one embodiment. Specifically, timelines 400 and 450 depicts the operation of batch job 390A executing in a first mode during two different runs/executions of batch job 390A. Similar timelines may be determined for the operation of the batch job during other modes of execution.

Timeline 400 is shown in seconds (as indicated by the 24-hour format "8:00:00"), with "08:00:00" indicating the start time of execution of the background process (point of initialization). Duration 415 represents the sub-block duration of one second, while duration 410 represents a block duration of one minute containing multiple (60) sub-block durations. Timeline 400 is shown having 8 block durations (t1 to t8) as indicated by 430. The block durations are shown to belonging to two phases as indicated by 440. Specifically, block durations t1 to t5 are shown belonging to phase P1, while block durations t6 to t8 are shown belonging to phase P2.

Timeline 450 is shown similar to timeline 400, but with the start time/point of initialization as "8:02:00" during another run/execution of the background process (possibly on another day). In the following description, it is assumed that timeline 450 corresponds to a current execution/run of the background process, while timeline 400 corresponds to a prior execution/run of the background process. It should be noted that the block durations and phases are determined with respect to the point of initialization, and accordingly remain the same in both timelines 400 and 450.

As noted above, after a suitable number of runs where the background process operates similar to timeline 400, performance manager 150 determines a baseline pattern of consumption of the resources corresponding to block durations t1 to t8.

In embodiments described below, the baseline pattern is representative of "relative consumption" of resources, identifying the correlation among the resources consumed by the background process in any given duration across prior executions. For example, performance manager 150 may determine that a background process consumes a large amount of first and second resources (e.g., CPU and number of read operations) while using only a small amount of third and fourth resources (e.g. memory and number of write operations). As such, the background process is deemed to be characterized by such a relative (baseline pattern of) consumption of the four resources.

According to an aspect, performance evaluator 150 generates a machine learning (ML) process model correlating the consumption of said the resources in a sequence of prior block durations across the normal prior executions of the background process. Thus, the process model captures the behavior of the background process/batch job during processing of different workloads (in corresponding durations). Performance manager 150 then predicts the baseline pattern of consumption based on the ML process model.

During a next/current run of the background process (timeline 450), performance manager 150 determines a current pattern of consumption of resources for each of block duration t1 and t8 and checks whether the current pattern has a deviation from the baseline pattern. Thus, at time instance 470 (8:08:00), performance manager 150 has determined a current pattern of consumption for the block duration t6 in timeline 450, and checks whether the current pattern has a deviation with a baseline pattern determined for that block duration t6 or for phase P2 as a whole.

In one embodiment, performance manager 150 determines that a deviation exists if the differences in consumption of the resources between the current pattern of consumption and the baseline pattern of consumption is disproportionate, and no deviation exists otherwise. For example, performance manager 150 may determine the differences in consumption of each resource and checks whether the ratios of the differences are the same or are similar (that is within an acceptable margin of error such as +5% to −5%). If the ratios are same/similar, that is, the change is proportionate (indicating that the background process is merely processing a larger amount of data), a deviation is determined to not exist. If the rations are different, that is, the change is disproportionate, performance manager 150 determines that a deviation exists.

In the specific example noted above, if the ratios of the differences in consumption of the first, second, third and fourth resources is not proportionate, then performance manager 150 determines that a deviation exists between the current and baseline patterns.

The description is continued with an example implementation of performance manager 150 provided according to several aspects of the present disclosure.

6. Sample Implementation

Figure 5:
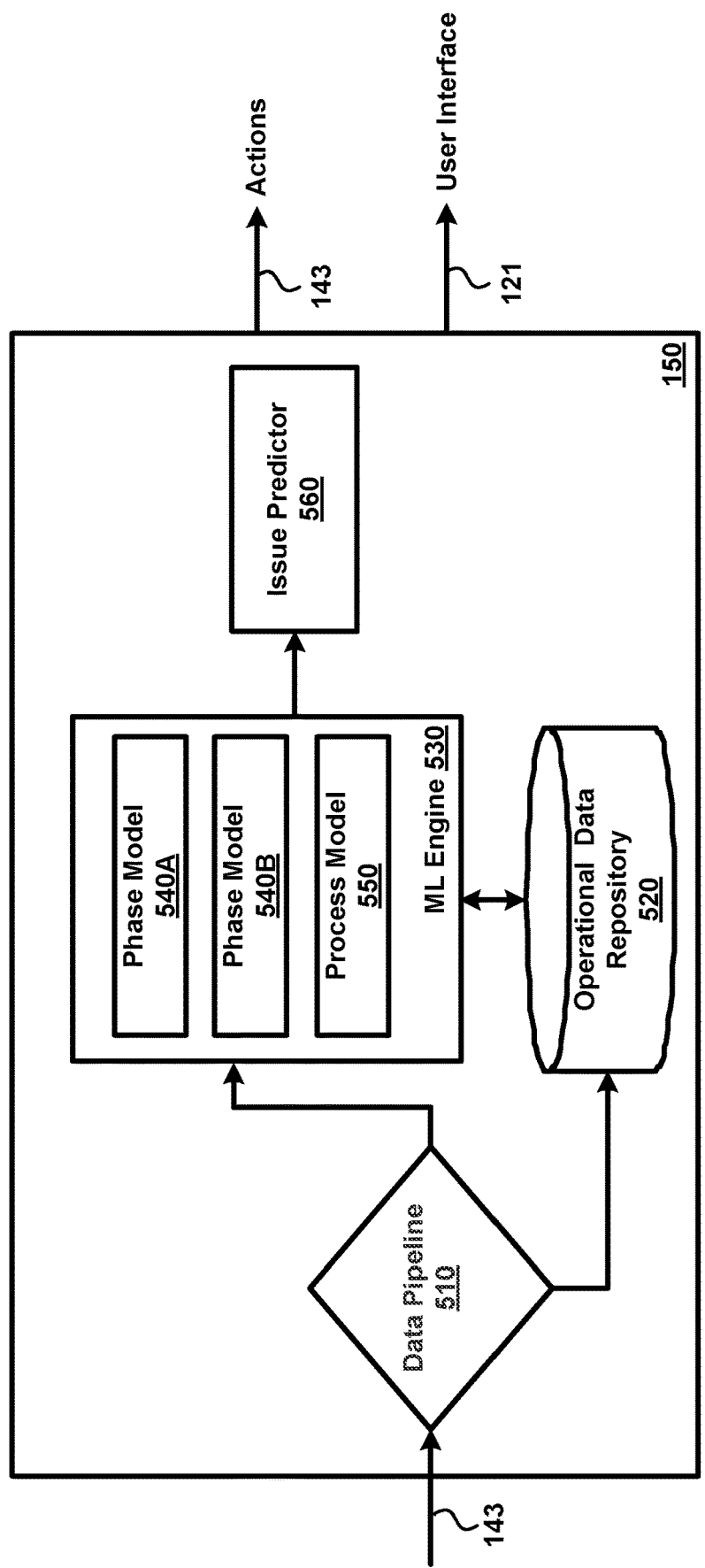
FIG. 5 is a block diagram depicting an example implementation of a performance manager in one embodiment.

FIG. 5 is a block diagram depicting an example implementation of a performance manager (150) in one embodiment. The block diagram is shown containing data pipeline 510, operational data repository (ODR) 520 and ML engine 530 (in turn, shown containing phase models 540A-540B and process model 550) and issue predictor 560. Each of the blocks is described in detail below.

Data pipeline 510 also receives the resource consumption metrics of the background processes of the software application (e.g. batch jobs) deployed in cloud infrastructure 130. Data pipeline 510 then stores the received consumption metrics in ODR 520. ODR 520 represents a data store that maintains portions of operation data. Though shown internal to performance manager 150, in alternative embodiments, ODR 520 may be implemented external to performance manager 150, for example, in one or more of nodes 160. Data pipeline 510 also forwards the consumption metrics to ML engine 530.

ML engine 530 generates various models that correlate the data received from data pipeline 510. The models may be generated using any machine learning approach such as KNN (K Nearest Neighbor), Decision Tree, etc. Various other machine learning approaches can be employed, as will be apparent to skilled practitioners, by reading the disclosure provided herein. In an embodiment, supervised machine learning approaches are used.

Phase models 540A-540B represent ML based models generated for different phases of a background process (executing in a first mode). Each phase model correlates the values for the resource metrics (consumption of the resources) in a corresponding phase during normal prior executions of the background process. Phase models 540A-540B are used to predict the baseline patterns of consumption for the different phases of the background process. Similar phase models may be generated corresponding to different modes of execution of the background process.

Process model 550 represents a ML based model generated for a background process. The process model correlates the values for the resource metrics (consumption of the resources) in a sequence of prior block durations (0 to t8 in timeline 400) across the normal prior executions of the background process. In one embodiment, process model 650 that correlates the values for the resource metrics for all phases is also generated.

Some general concepts to generating a process/phases model in an embodiment is described in US Patent entitled, "Proactive Information Technology Infrastructure Management", U.S. Pat. No. 8,903,757 B2, naming as inventor Desikachari, and Applicant as "Appnomic Systems Private Limited".

Issue predictor 560 generates notifications regarding anomalies (indicative of future issues) detected based on phase models 540A-540B and/or process model 550. The notifications may be sent to a user using end user system 110 (e.g. via path 121) and/or used as the basis for performing suitable actions for fixing the detected anomalies (e.g. via path 143).

It may be appreciated that by detecting anomalies early and sending notifications, users are enabled to be provided an early indication of a potential problem during the execution of the background process itself. The description is continued with sample data that may be maintained in ODR 520 followed by the real-time operation of performance manager 150.

7. Sample Data

Figure 6A:
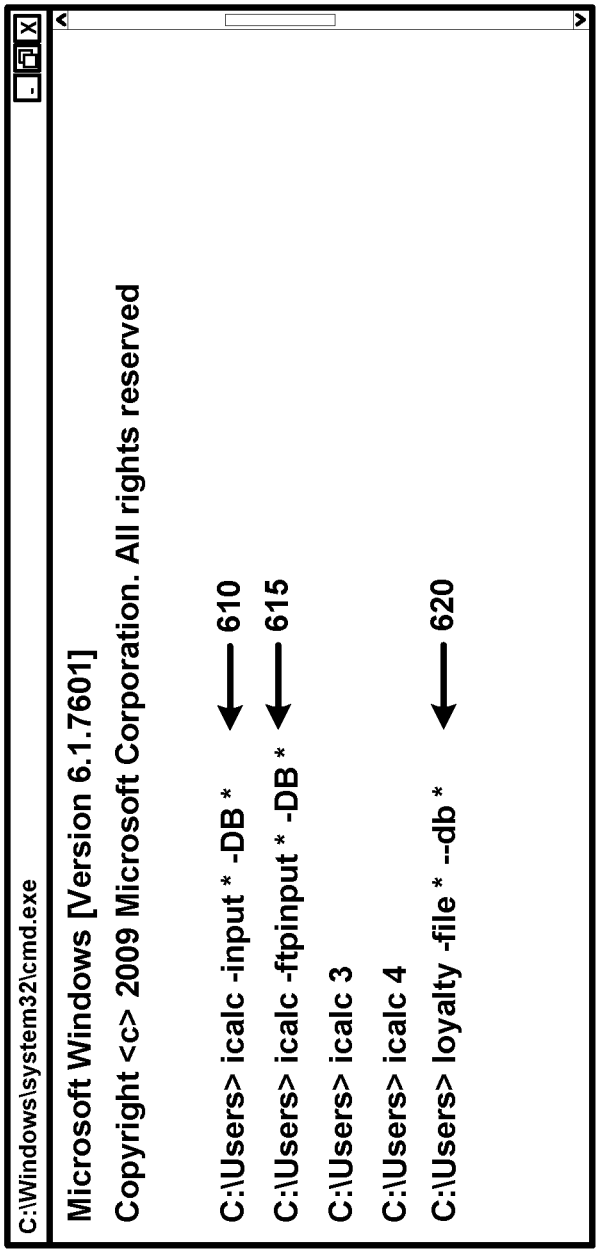
FIG. 6A depicts sample command-line patterns used to initiate execution of background process in one embodiment.

FIGS. 6A through 6C depicts sample data used in the early identification of problems in execution of background processes in one embodiment. Though shown in the form of tables, the sample data may be collected/maintained according to other data formats (such as extensible markup language (XML), etc.) and/or using other data structures (such as lists, trees, etc.), as will be apparent to one skilled in the relevant arts by reading the disclosure herein.

FIG. 6A depicts sample command-line patterns used to initiate execution of background process in one embodiment. As noted above, performance manager 150 monitors background processes executing in nodes 160 of computing infrastructure 130. In one embodiment, the background processes are abstracted as corresponding "command line" (e.g. "icalc—input *–DB *") used to initiate execution of the background process. Command lines 610 and 615 are used to initiate the execution of a background process named "icalc" (hereinafter referred to as background process A and corresponding to batch job 390B), while command line 620 is used to initiate execution of the "loyalty" background process (hereinafter referred to as background process B and corresponding to batch job 390A).

According to an aspect, a background process (the same execution file) is designed to execute in multiple modes, wherein each mode causes the background process to execute in a respective set of phases. In one embodiment, the specific mode (of execution of the background process) is specified as a part of the command line. For example, in the command lines 610 and 615, the texts "-input" and "-ft-pinput" indicates the different modes in which the background process is to be operate during execution. In alternative embodiments, the mode information may be determined based on a configuration file, a database entry or from the operating system.

During execution of the background process, performance manager 150 collects OS (operating system) level resource consumption metrics such as CPU used, memory, number of write operations, number of read operations, threads in process, etc. for different block durations. The manner in which resource metrics for a background process B ("loyalty" in command line 620) is collected and stored is described below.

FIG. 6B is a resource table depicting the resource consumption metrics of a background process (B) of a software application in multiple block durations, in one embodiment. In resource table 660, the columns indicate the resources such as "CPU used (milliseconds)", "Memory (MB)", etc., while the rows indicate the block durations of one minute each. Each cell (at the intersection of a row and a column) thus indicates the consumption metric for the corresponding resource in respective block duration. For example, resource table 660 indicates that the # (number) of write operations performed by background process B in the block duration "Jan. 21, 2020 0:06" (that is from "0:05" to "0:06") is 44.

Similar resource tables may be captured and stored in ODR 520 for other runs/executions of the same background process (B) and for other background processes as well.

FIG. 6C is a baseline table depicting the baseline resource consumption of a background process (B) of a software application in multiple block durations, in one embodiment. In baseline table 680, similar to resource table 660, the columns indicate the resources such as "CPU used (milliseconds)", "Memory (MB)", etc., while the rows indicate the block durations of one minute each.

However, each cell (at the intersection of a row and a column) indicates the baseline consumption for the corresponding resource in respective block duration. The baseline consumption of a resource for a block duration is determined based on the corresponding resource metrics across multiple executions/runs of the background process. For example, baseline table 680 indicates that the baseline # (number) of write operations performed by background process B in the block duration "0:06" (that is from "0:05" to "0:06") has been computed as 49.

It should be noted that that baseline table 680 corresponds a single mode of execution of background process (B). Similar baseline tables may be maintained corresponding to the different modes of execution of a background process. In addition, it is assumed that the baseline metrics of multiple phases are maintained in a single baseline table. However, in alternative embodiments, separate baseline table may be maintained for each phase of each mode of execution of the background process.

Thus, performance manager 150 maintains various data required for early identification of problems in execution of background processes. The manner in which performance manager 150 uses the data to provide several aspects of the present disclosure is described below with examples.

During real-time operation, performance manager 150 first collects/receives actual resource consumption metrics similar to the data shown in the columns of resource table 660 for a current block duration (one row in table 660). The description is continued assuming the current block duration is t6 in timeline 450.

Performance manager 150 then identifies a mode and phase associated with the current block duration. As noted above, the mode is identified based on the command line used to initiate execution of the background process. The phase is determined based on the relative position of the current block duration with respect to the point of initiation along the timeline of execution (here, 450). For example, for t6, the mode is determined to be the first mode (in view of the text "-file" in command line 620) and the phase is P2 in view t6 being containing in P2 in timeline 450.

Performance manager 150 then determines a baseline table (similar to table 680) to be used based on the identified mode and phase. Upon determining the baseline table, performance manager 150 compares the resource metrics corresponding to the same block duration (t6) in the baseline table with the metrics received for the current block duration. As noted above, any convenient approach can be used for performing the comparison and to determine whether a deviation exists. If such a deviation is determined to exist, performance manager 150 notifies a potential problem with the current execution of the background process According to an aspect of the present disclosure, performance manager 150 provides to a user (such as a developer or customer of a software application) the calculated baseline metrics and the actual resource consumption metrics of different background processes of a software application. Some sample user interfaces that may be provided by performance manager 150 are described in detail below.

8. Sample User Interfaces

FIGS. 7A-7E depict various user interfaces provided to a user for viewing of the baseline/actual resource consumption metrics of background processes in one embodiment. Display area 700 represents a portion of a user interface displayed on a display unit (not shown) associated with one of end-user systems 110. In one embodiment, display area 700 corresponds to a web page rendered by a browser executing on the end-user system. Web pages are provided by performance manager 150 in response to a user sending appropriate requests (for example, by specifying corresponding URLs in the address bar) using the browser.

Figure 7A:
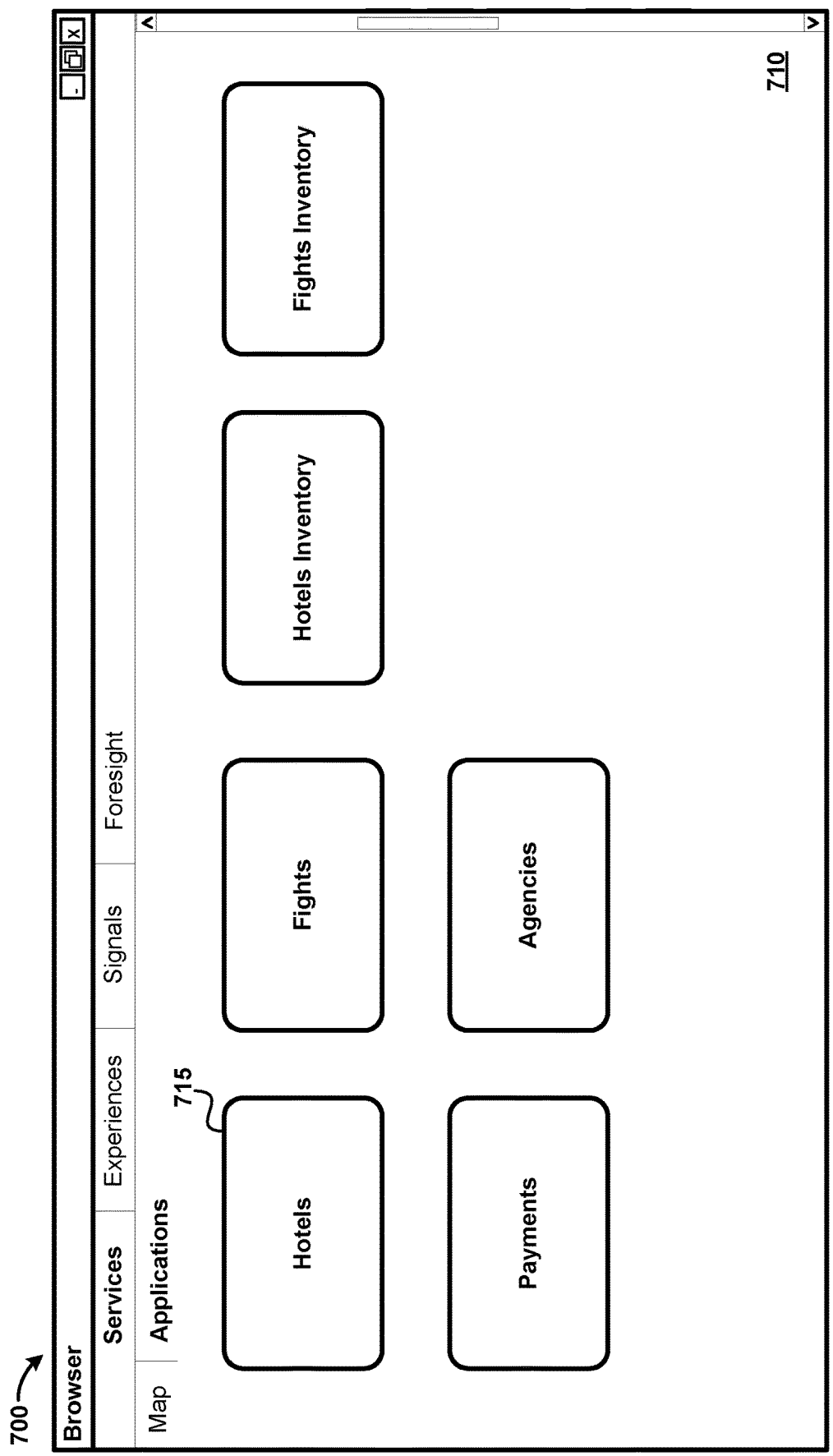

Referring to FIG. 7A, display area 710 depicts a list of software applications executing in computing infrastructure 710. A user may select and correspondingly view the details of the any of the software application. The description is continued assuming that the user has selected "Hotels" application 715.

Figure 7B:
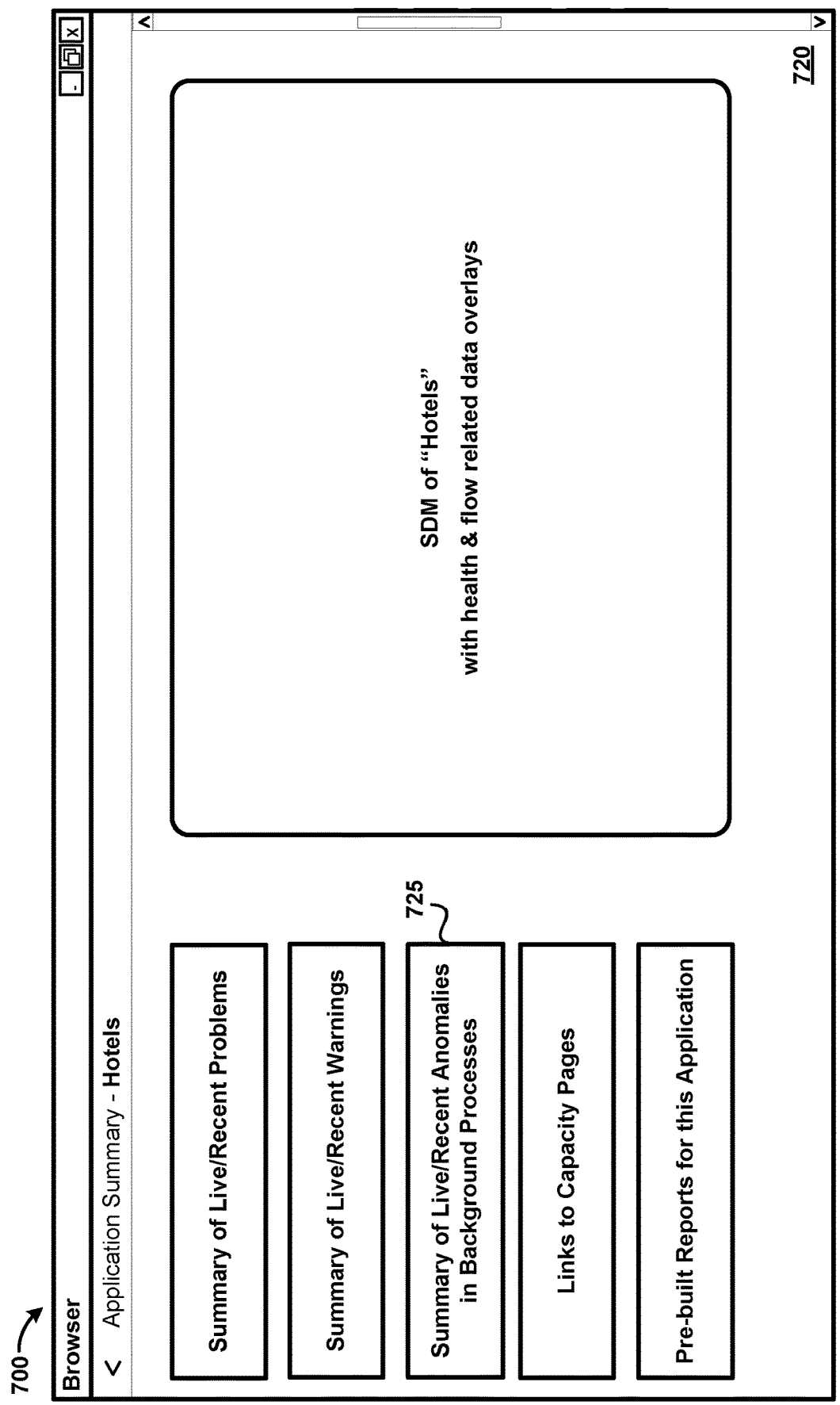

Referring to FIG. 7B, display area 720 depicts the details of execution of the software application "Hotels". Display are 720 may be displayed in response to the user selecting 715 in FIG. 7A. It may be appreciated that the details include option 725 that enables the user to view a summary of the live/recent anomalies in background process. The description is continued assuming that the user has selected option 725.

Figure 7C:
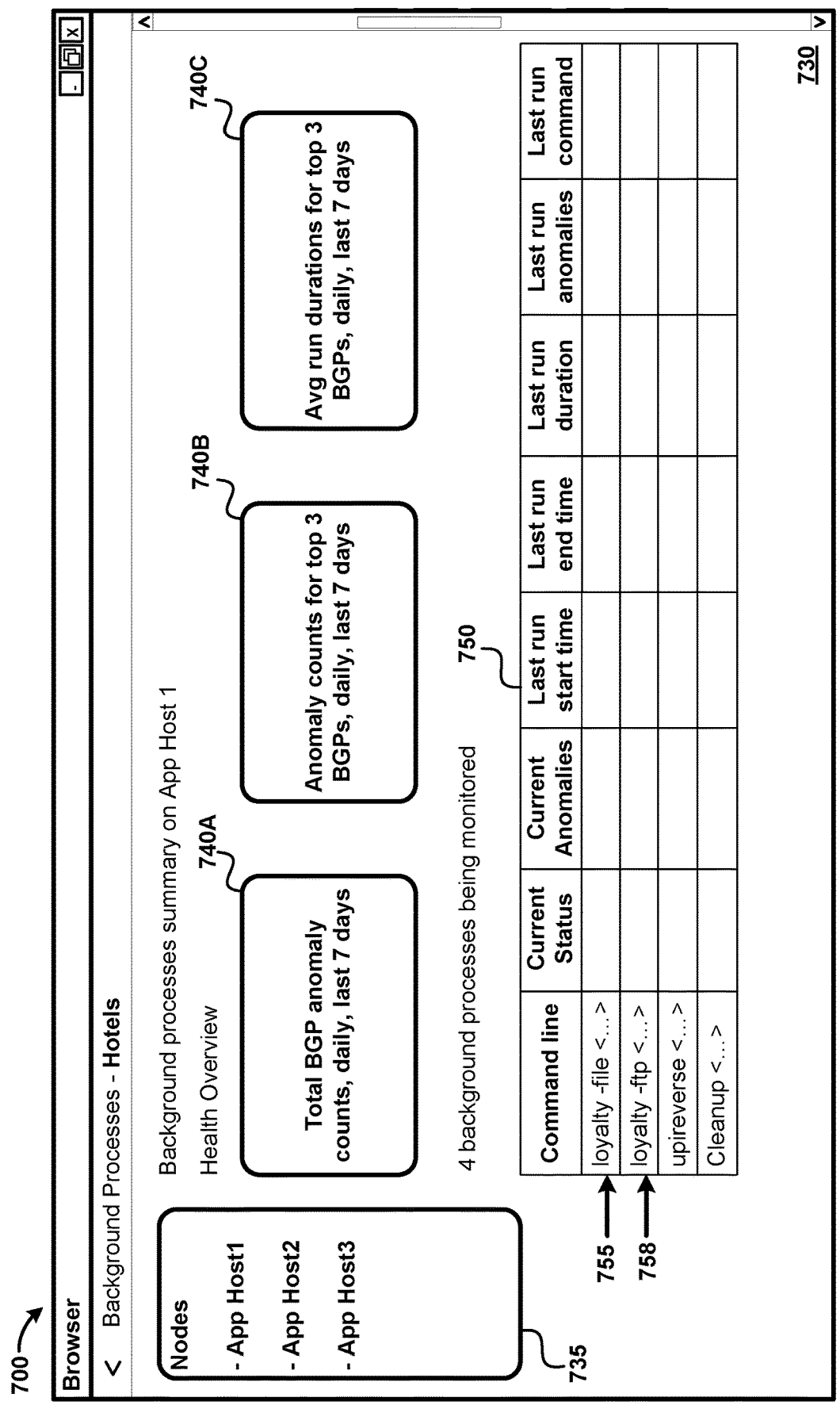

Referring to FIG. 7C, display area 730 depicts a list of background processes executed in the node named "App Host1". Display area 730 may be displayed in response to a user selecting option 720 in FIG. 7B. Alternatively, the link to the list of background processes may be provided on "Service Instance" page (not shown) where the host where the instance runs have background processes being monitored.

Display area 735 depicts a list of hosts/nodes (of computing infrastructure 130) executing background process of the software application (e.g. online travel application). A user may select any of the hosts/nodes listed (such as "App Host 1" indicated there) and view the details of execution of the background process in that selected host/node. Each of display areas 740A-740C provides a summary about the execution of the background processes (BGP) such as "Total BGP anomaly counts, daily, last 7 days", "Anomaly counts for top 3 BGPs, daily, last 7 days", etc.

Display area 750 depicts the details of the executed background processes in a tabular form. Specifically, rows 755 and 758 respectively indicate the details of the execution background process B ("loyalty") in a first mode and second mode. A user may select any of the rows and correspondingly view the details of execution of the background process in the selected row. The description is continued assuming the user has selected row 755 in display area 750.

Referring to FIG. 7D, display area 760 depicts a list of runs/executions of a single background process B (identified by the command line "loyalty-file *-db *") on the node "App Host1". Display area 760 may be displayed in response to a user selecting row 755 in FIG. 7C. Each of display areas 765A-765C provides a summary about the execution of the single background process such as "Daily Anomaly counts, last 7 days", "Avg run durations, last 7 days", etc.

Display area 770 depicts visual graphs of the ML based baseline patterns of consumption determined for the single background process on that specific host. It may be readily observed that display area 770 includes two visual graphs corresponding to the two phases (P1 and P2) of background process B. In one embodiment, each of the visual graph is in the form of a radar chart, described in detail below with respect to FIG. 7E.

Display area 780 depicts the details of runs of a single background process (B) in a tabular form. Specifically, each of rows corresponds to a single run/execution of the single background process. A user may select any of the rows and correspondingly view the details of the single run corresponding to the selected row. The description is continued assuming the user has selected row 785 in display area 780.

Figure 7E:
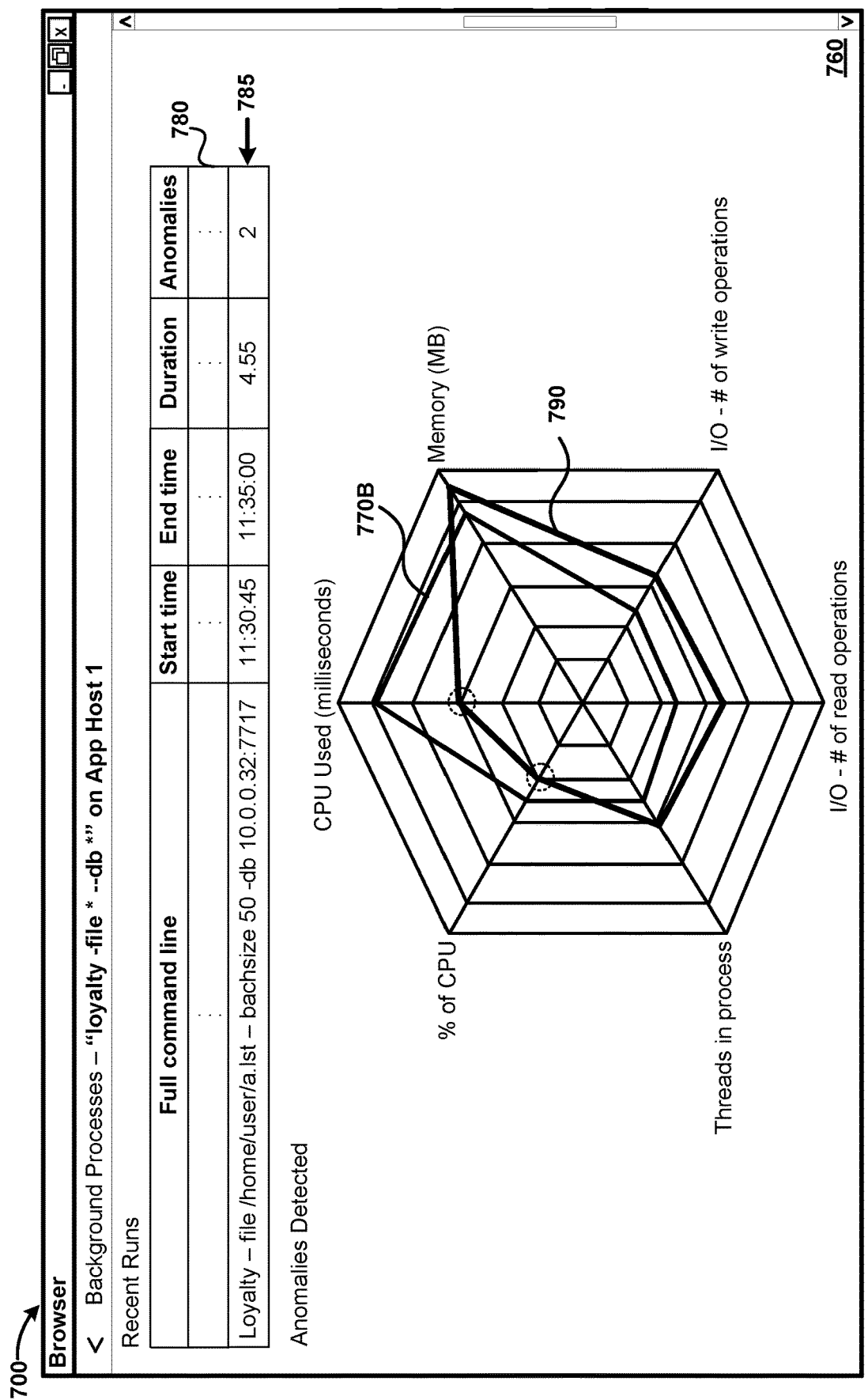

Referring to FIG. 7E, display area 760 is shown scrolled down and displaying a radar chart 790 in response to a user selecting row 785 in display area 780 of FIG. 7D. Radar chart 790 has resources (such as "CPU used (milliseconds)", "Memory (MB)") represented as the axes of the radar chart and the consumption of the resources displayed as points along the axes, wherein each pattern of consumption of resources is represented as a corresponding shape connecting the points in the radar chart.

It should be appreciated that the radar chart is a cross section view of resources consumed by a background process at any given time instance. Other charts such as cylindrical bar charts with varying shape of cross-sections representing the amounts of a resource consumed by a background process during its execution/run may also be displayed.

As such, the baseline pattern of consumption and the current pattern of consumption are displayed as corresponding shapes 770B and 795 in radar chart 790. A set of resources ("CPU used (milliseconds)" and "% of CPU") that are determined to have a deviation from the baseline (that is, anomalies) are shown highlighted using dotted circles around the corresponding points in radar chart 790.

It may be readily appreciated that FIGS. 7A-7E may be provided in real-time during an execution/run of a background process. Accordingly, a user is provided with early indication of potential problems during the execution of the background process itself.

It should be further appreciated that the features described above can be implemented in various embodiments as a desired combination of one or more of hardware, software, and firmware. The description is continued with respect to an embodiment in which various features are operative when the software instructions described above are executed.

9. Digital Processing System

Figure 8:
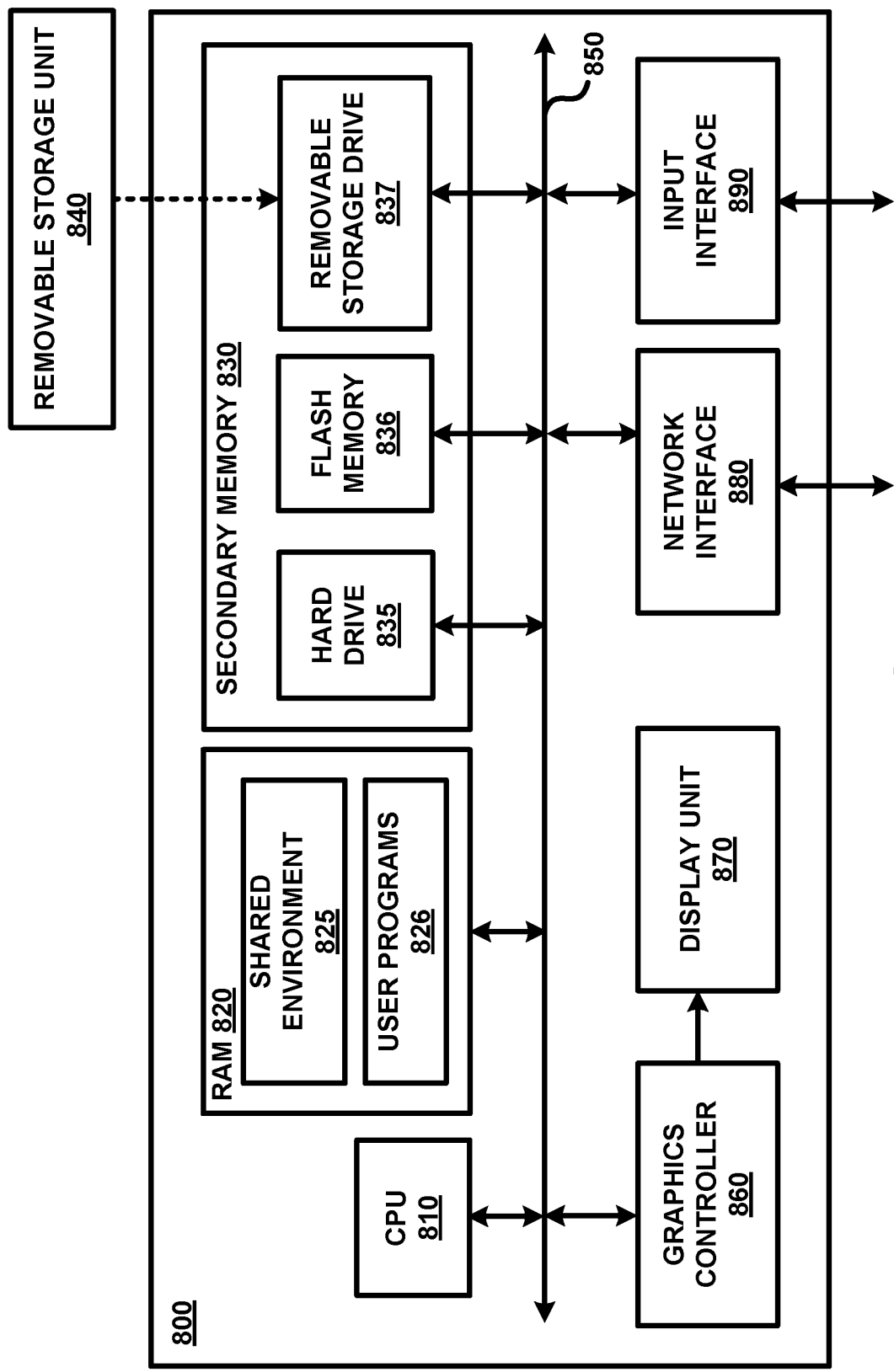
FIG. 8 is a block diagram illustrating the details of a digital processing system in which various aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to performance manager 150 (or any system implementing performance manager 150).

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). In addition to shared environment 825, RAM 820 may contain other software programs such as device drivers, virtual machines, etc., which provide a (common) run time environment for execution of other/user programs.

Graphics controller 860 generates display signals (e.g., in RGB format) to display unit 870 based on data/instructions received from CPU 810. Display unit 870 contains a display screen to display the images defined by the display signals (for example, portions of the graphical user interfaces of FIGS. 7A-7E). Input interface 890 may correspond to a keyboard and a pointing device (e.g., touch-pad, mouse) and may be used to provide inputs (for example, the inputs required for the graphical user interfaces of FIGS. 7A-7E). Network interface 880 provides connectivity to a network (e.g., using Internet Protocol), and may be used to communicate with other systems connected to the networks.

Secondary memory 830 may contain hard drive 835, flash memory 836, and removable storage drive 837. Secondary memory 830 may store the data (e.g. data portions of FIGS. 6A-6C) and software instructions (e.g. for implementing the steps of FIG. 2 or blocks of FIG. 5), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine-readable medium storing one or more sequences of instructions for early identification of problems in execution of background processes, wherein execution of said one or more instructions by one or more processors contained in a digital processing system causes said digital processing system to perform the actions of:

characterizing the consumption of a plurality of resources during normal prior executions of a background process, wherein a normal prior execution of said background process processes as a corresponding batch, transactions received in a corresponding duration prior to initiation of said background process, wherein said characterizing determines a baseline pattern of consumption of said plurality of resources for said background process;

initiating, after said characterizing, a current execution of said background process for processing as a first batch, a first plurality of transactions received prior to said initiating of said current execution;

monitoring a current pattern of consumption of said plurality of resources during said current execution of said background process;

checking whether said current pattern of consumption has a deviation from said baseline pattern of consumption; and notifying a potential problem with said current execution of said background process if said checking determines that said deviation exists.

2. The non-transitory machine readable medium of claim 1, wherein said checking determines that said deviation exists if the differences in consumption of said plurality of resources between said current pattern of consumption and said baseline pattern of consumption is disproportionate to said baseline pattern of consumption.

3. The non-transitory machine readable medium of claim 1, wherein said characterizing comprises determining the consumption of said plurality of resources in a respective sequence of prior block durations of equal time span during each of said normal prior executions, wherein said monitoring comprises determining said current pattern of consumption for each of a first sequence of current block durations of said equal time span during said current execution, wherein said checking is performed for each of said first sequence of current block durations.

4. The non-transitory machine readable medium of claim 3, wherein said characterizing further comprises one or more instructions for:

generating a machine learning (ML) process model correlating the consumption of said plurality of resources in said sequence of prior block durations across said normal prior executions; and predicting said baseline pattern of consumption based on said ML process model.

5. The non-transitory machine readable medium of claim 1, wherein said background process comprises a plurality of threads, wherein said plurality of resources include CPU used, memory used, number of read operations, and a number of write operations by all of said plurality of threads in said background process.

6. The non-transitory machine readable medium of claim 1, wherein execution of said background process comprises a plurality of phases, with each phase representing a corresponding duration of execution of said background process, wherein said characterizing determines corresponding baseline patterns of consumption for each of said plurality of phases based on the consumption of resources of said background process in the corresponding durations, wherein said monitoring identifies that said background process is operating in a first phase of said plurality of phases, wherein said checking and notifying are performed with respect to a first baseline pattern of consumption determined for said first phase.

7. The non-transitory machine readable medium of claim 6, wherein said characterizing further comprises one or more instructions for:

generating machine learning (ML) phase models corresponding to said plurality of phases, each ML phase model correlating the consumption of said plurality of resources in a corresponding phase during normal prior executions of said background process; and predicting said corresponding baseline patterns of consumption for said plurality of phases based on said ML phase models.

8. The non-transitory machine readable medium of claim 6, wherein said background process is designed to execute in a plurality of modes, wherein each mode causes said background process to execute in respective plurality of phases, wherein said characterizing determines a corresponding set of baseline patterns of consumption for each of said plurality of modes, said corresponding set including respective baseline patterns for each of said respective plurality of phases;

wherein said monitoring identifies that said background process is operating in a first mode of said plurality of modes, wherein said checking and notifying are performed with respect to a first set of baseline patterns of consumption determined for said first mode, wherein said first baseline pattern is identified as the baseline pattern corresponding to said first phase in said first set of baseline patterns.

9. The non-transitory machine readable medium of claim 8, wherein said background process is identified by a command line used to initiate execution of said background process, wherein said first mode is specified as a part of said command line.

10. The non-transitory machine readable medium of claim 1, further comprising one or more instructions for:

displaying a radar chart with said plurality of resources represented as the axes of said radar chart and the consumption of said plurality of resources displayed as points along the axes, wherein each pattern of consumption of resources is represented as a corresponding shape connecting said points in said radar chart, wherein said baseline pattern of consumption and said current pattern of consumption are displayed as corresponding shapes in said radar chart.

11. The non-transitory machine readable medium of claim 10, further comprising one or more instructions for highlighting, in said radar chart, a set of resources that are determined to have said deviation based on said checking.

12. A method for early identification of problems in execution of background processes, the method comprising:

characterizing the consumption of a plurality of resources during normal prior executions of a background process, wherein a normal prior execution of said background process processes as a corresponding batch, transactions received in a corresponding duration prior to initiation of said background process, wherein said characterizing determines a baseline pattern of consumption of said plurality of resources for said background process;

initiating, after said characterizing, a current execution of said background process for processing as a first batch, a first plurality of transactions received prior to said initiating of said current execution;

monitoring a current pattern of consumption of said plurality of resources during said current execution of said background process;

checking whether said current pattern of consumption has a deviation from said baseline pattern of consumption; and notifying a potential problem with said current execution of said background process if said checking determines that said deviation exists.

13. The method of claim 12, wherein said checking determines that said deviation exists if the differences in consumption of said plurality of resources between said current pattern of consumption and said baseline pattern of consumption is disproportionate to said baseline pattern of consumption.

14. The method of claim 12, wherein said characterizing comprises determining the consumption of said plurality of resources in a respective sequence of prior block durations of equal time span during each of said normal prior executions, wherein said monitoring comprises determining said current pattern of consumption for each of a first sequence of current block durations of said equal time span during said current execution, wherein said checking is performed for each of said first sequence of current block durations.

15. The method of claim 12, wherein execution of said background process comprises a plurality of phases, with each phase representing a corresponding duration of execution of said background process, wherein said characterizing determines corresponding baseline patterns of consumption for each of said plurality of phases based on the consumption of resources of said background process in the corresponding durations, wherein said monitoring identifies that said background process is operating in a first phase of said plurality of phases, wherein said checking and notifying are performed with respect to a first baseline pattern of consumption determined for said first phase.

16. The method of claim 12, further comprising:

displaying a radar chart with said plurality of resources represented as the axes of said radar chart and the consumption of said plurality of resources displayed as points along the axes, wherein each pattern of consumption of resources is represented as a corresponding shape connecting said points in said radar chart, wherein said baseline pattern of consumption and said current pattern of consumption are displayed as corresponding shapes in said radar chart.

17. A digital processing system comprising:

a random access memory (RANI) to store instructions; and one or more processors to retrieve and execute the instructions, wherein execution of the instructions causes the digital processing system to perform the actions of:

characterizing the consumption of a plurality of resources during normal prior executions of a background process, wherein a normal prior execution of said background process processes as a corresponding batch, transactions received in a corresponding duration prior to initiation of said background process, wherein said characterizing determines a baseline pattern of consumption of said plurality of resources for said background process;

initiating, after said characterizing, a current execution of said background process for processing as a first batch, a first plurality of transactions received prior to said initiating of said current execution;

monitoring a current pattern of consumption of said plurality of resources during said current execution of said background process;

checking whether said current pattern of consumption has a deviation from said baseline pattern of consumption; and notifying a potential problem with said current execution of said background process if said checking determines that said deviation exists.

18. The digital processing system of claim 17, wherein said digital processing system determines that said deviation exists if the differences in consumption of said plurality of resources between said current pattern of consumption and said baseline pattern of consumption is disproportionate to said baseline pattern of consumption.

19. The digital processing system of claim 17, wherein for said characterizing said digital processing system performs the actions of determining the consumption of said plurality of resources in a respective sequence of prior block durations of equal time span during each of said normal prior executions, wherein for said monitoring said digital processing system performs the actions of determining said current pattern of consumption for each of a first sequence of current block durations of said equal time span during said current execution, wherein said digital processing system performs said checking for each of said first sequence of current block durations.

20. The digital processing system of claim 17, wherein execution of said background process comprises a plurality of phases, with each phase representing a corresponding duration of execution of said background process, wherein for said characterizing, said digital processing system determines corresponding baseline patterns of consumption for each of said plurality of phases based on the consumption of resources of said background process in the corresponding durations, wherein for said monitoring, said digital processing system identifies that said background process is operating in a first phase of said plurality of phases, wherein said digital processing system performs said checking and notifying with respect to a first baseline pattern of consumption determined for said first phase.

\* \* \* \* \*